P. D. BURGHER.
SHINGLE-MACHINE.
No. 178,992.  Patented June 20, 1876.
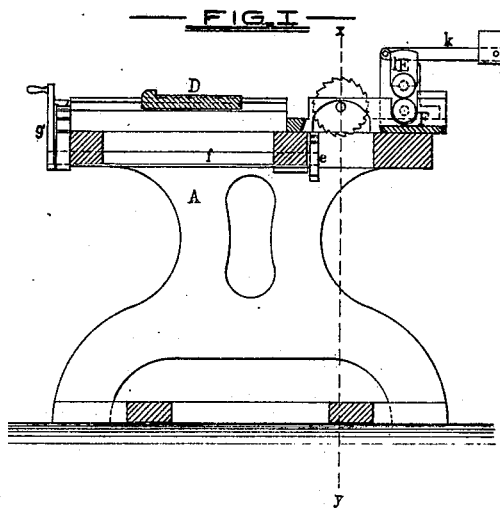
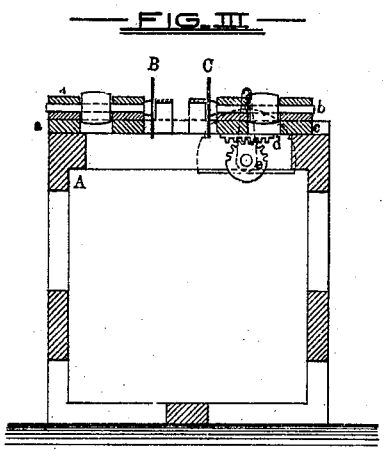
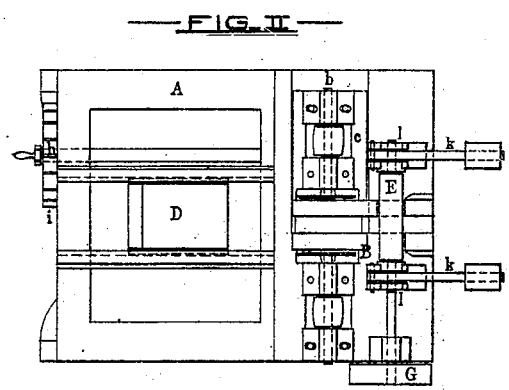
WITNESSES  
Wm W Touser  
W W Wharton
INVENTOR  
Peter D. Burgher  
by G. W. & T. Howard  
Atty

UNITED STATES PATENT OFFICE.

PETER D. BURGHER, OF DEEP CREEK, VIRGINIA.

IMPROVEMENT IN SHINGLE-MACHINES.

Specification forming part of Letters Patent No. 178,992, dated June 20, 1876; application filed April 12, 1876.

*To all whom it may concern:*

Be it known that I, PETER D. BURGHER, of Deep Creek, in the county of Norfolk and State of Virginia, have invented certain new and useful Improvements in Shingle-Machines, of which the following is a specification; and I do hereby declare that in the same is contained a full, clear, and exact description of my said invention, reference being had to the accompanying drawing, and to the letters of reference marked thereon.

My invention relates to a machine for sawing off the sappy and uneven edges of shingles, and for reducing the said shingles to certain sizes or widths, governed by the widths of the shingles in a rough or undressed state.

The machine embodying my invention consists of a table, to which two circular saws in frames are attached, one saw and frame being fixed or stationary as regards any motion other than a circular one, and the other laterally adjustable or adapted to have a movement to and from the stationary saw aforesaid. The movement of the adjustable saw is obtained through the medium of a pinion and rack, and the shingles are drawn or fed to the saws by means of rollers, the under one of which is revolved by a belt running over a pulley secured to an extension thereof.

In the further description of my invention, which follows, due reference must be had to the accompanying drawing, forming a part of this specification, and in which—

Figure 1 is a sectional side view of the machine; Fig. 2, a plan of the same; and Fig. 3, a sectional view upon the line $x\,y$.

Similar letters of reference indicate similar parts in all the figures.

A is the table, and B the stationary or fixed circular saw, secured in suitable bearings in a frame, $a$, on the top of the table. C is the adjustable saw, fastened to the spindle $b$, which revolves in the sliding frame $c$. The sliding motion of the frame $c$ and saw C is obtained through the agency of a rack, $d$, secured to the under side of the frame, and with which a pinion, $e$, engages. The pinion $e$ is revolved by means of the shaft $f$ and crank $g$. A pointer, $h$, and index-plate $i$, used in connection with the crank $g$, assists the operator in sawing the shingles to regular sizes.

Other parts of the machine (not yet alluded to) will be described in the description of the operation of sawing shingles, which follows.

The rough shingle is placed upon the slide D and moved toward the saw, and the adjustable saw C placed in such position, by means of the crank $g$ and its connecting mechanism, as will give to the shingle, when sawed, the greatest width allowed by the sound wood contained therein. The shingle is then forced into contact with the saws by hand, until the sawed portion thereof is caught between the rollers E and F, when the slide D may be withdrawn, and another rough shingle placed thereon. The lower roller F is revolved by means of a belt running over a pulley, G, keyed to an extension of the said roller, which is confined within suitable bearings. The upper roller E is loose, and rests upon the shingle with a pressure regulated by the weighted levers $k$, which, through the medium of the movable boxes $l$, press upon the trunnions thereof. The object in placing the saws upon independent spindles is to allow of their being set with their faces diverging slightly from the line of the cut. This prevents the saw from touching the shingle, except at the cutting-point.

Having thus described my invention, what I claim as new, and desire to secure by Letters Patent of the United States, is—

In a machine for edging shingles or lumber, a fixed and a laterally adjustable circular saw, mounted upon independent shafts, combined with a sliding table for bringing the shingle or lumber in contact with the saws, and rollers for continuing the motion of the shingle or lumber toward and from said saws, substantially as herein specified.

In testimony whereof I have hereunto subscribed my name this 20th day of March, in the year of our Lord 1875.

PETER D. BURGHER.

Witnesses:
J. A. STOTT,
G. W. WALLACE.